(12) United States Patent
Chauvel et al.

(10) Patent No.: US 6,772,326 B2
(45) Date of Patent: Aug. 3, 2004

(54) INTERRUPTIBLE AN RE-ENTRANT CACHE CLEAN RANGE INSTRUCTION

(75) Inventors: Gerard Chauvel, Antibes (FR); Serge Lasserre, Frejus (FR); Dominique D'Inverno, Villeneuve-Loubet (FR)

(73) Assignee: Texas Instruments Incorporated, Dallas, TX (US)

( * ) Notice: Subject to any disclaimer, the term of this patent is extended or adjusted under 35 U.S.C. 154(b) by 177 days.

(21) Appl. No.: 10/157,576

(22) Filed: May 29, 2002

(65) Prior Publication Data

US 2003/0097550 A1 May 22, 2003

(30) Foreign Application Priority Data

Nov. 15, 2001 (EP) ............................................. 01402956

(51) Int. Cl.[7] ............................................... G06F 9/44
(52) U.S. Cl. ...................... 712/244; 711/125; 711/135; 711/158; 712/40; 712/227
(58) Field of Search .......................... 712/40, 227, 244; 711/118, 125, 135, 158

(56) References Cited

U.S. PATENT DOCUMENTS

| 4,459,657 | A | | 7/1984 | Murao |
| 4,498,136 | A | * | 2/1985 | Sproul, III ................... 710/262 |
| 4,740,893 | A | | 4/1988 | Buchholz et al. |
| 5,889,973 | A | * | 3/1999 | Moyer ......................... 712/200 |
| 6,029,222 | A | | 2/2000 | Kamiya |
| 6,378,022 | B1 | * | 4/2002 | Moyer et al. ................ 710/260 |

FOREIGN PATENT DOCUMENTS

FR    2 778 256 A    11/1999

* cited by examiner

Primary Examiner—Hiep T. Nguyen
(74) Attorney, Agent, or Firm—Robert D. Marshall, Jr.; W. James Brady, III; Frederick J. Telecky, Jr.

(57) ABSTRACT

A digital system and method of operation is provided in which a method is provided for cleaning a range of addresses in a storage region specified by a start parameter and an end parameter. An interruptible clean instruction (802) can be executed in a sequence of instructions (800) in accordance with a program counter. If an interrupt (804) is received during execution of the clean instruction, execution of the clean instruction is suspended before it is completed. After performing a context switch (810), the interrupt is serviced (820). Upon returning from the interrupt service routine (830, 834), execution of the clean instruction is resumed by comparing the start parameter and the end parameter provided by the clean instruction with a current content of a respective start register and end register used during execution of the clean instruction. If the same, execution of the clean instruction is resumed using the current content of the start register and end register. If different, execution of the clean instruction is restarted by storing the start parameter provided by clean instruction in the start register and by storing the end parameter in the end register. In this manner, no additional context information needs to be saved during a context switch in order to allow the clean instruction to be interruptible. If the interrupt occurred during a non-interruptible instruction, then the instruction is completed before the context switch and a return (830, 832) after the interrupt service routine begins execution at the next instruction (803). Other instructions that perform a sequence of operations can also be made interruptible in a similar manner.

19 Claims, 9 Drawing Sheets

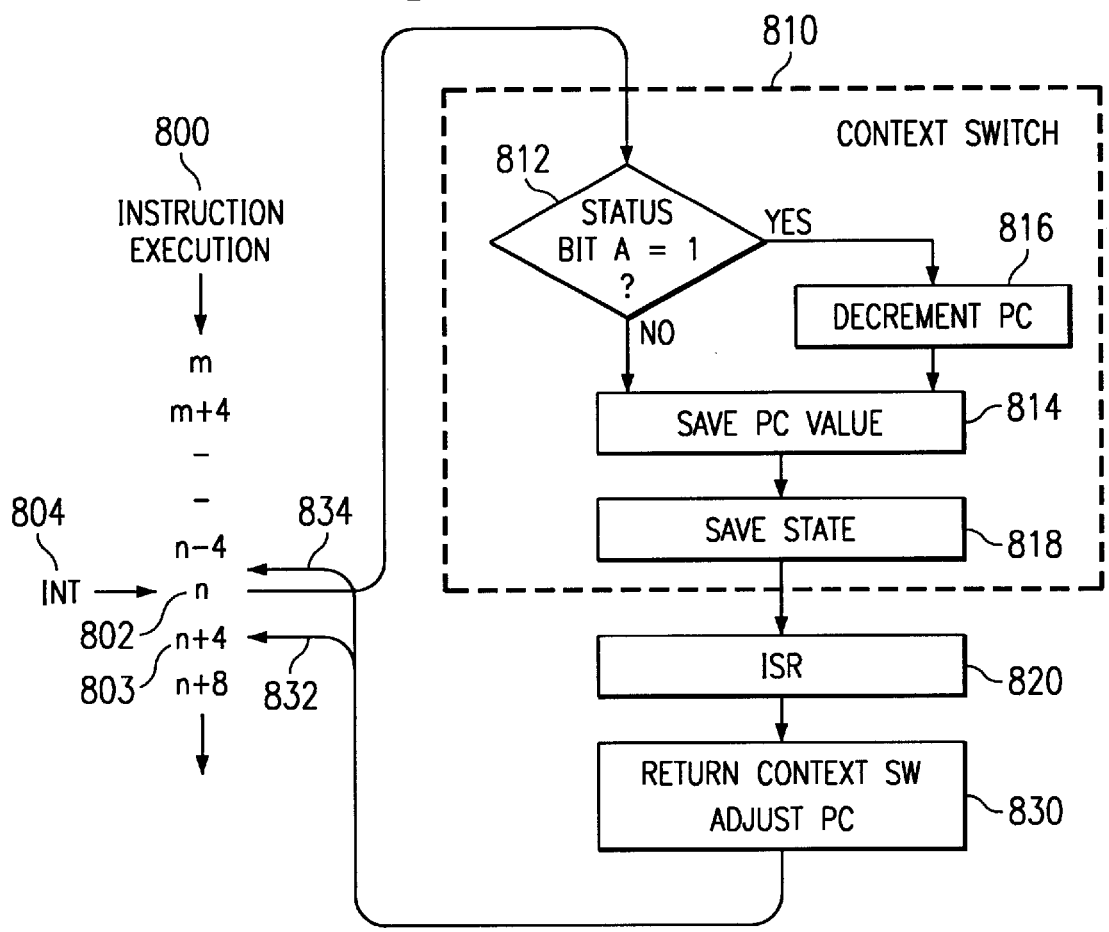

INTERRUPTIBLE AN RE-ENTRANT CACHE CLEAN RANGE INSTRUCTION

This application claims priority to European Application Serial No. 01402956.5 filed Nov. 15, 2001. U.S. patent application Ser. No. 09/932,651 is incorporated herein by reference.

FIELD OF THE INVENTION

This invention generally relates to microprocessors, and more specifically to improvements in operation and use of cache memory, systems, and methods of making.

BACKGROUND

Microprocessors are general-purpose processors that provide high instruction throughputs in order to execute software running thereon, and can have a wide range of processing requirements depending on the particular software applications involved. A cache architecture is often used to increase the speed of retrieving information from a main memory. A cache memory is a high speed memory that is situated between the processing core of a processing device and the main memory. The main memory is generally much larger than the cache, but also significantly slower. Each time the processing core requests information from the main memory, the cache controller checks the cache memory to determine whether the address being accessed is currently in the cache memory. If so, the information is retrieved from the faster cache memory instead of the slower main memory to service the request. If the information is not in the cache, the main memory is accessed, and the cache memory is updated with the information.

Many different types of processors are known, of which microprocessors are but one example. For example, Digital Signal Processors (DSPs) are widely used, in particular for specific applications, such as mobile processing applications. DSPs are typically configured to optimize the performance of the applications concerned and to achieve this they employ more specialized execution units and instruction sets. Particularly in applications such as mobile telecommunications, but not exclusively, it is desirable to provide ever-increasing DSP performance while keeping power consumption as low as possible.

To further improve performance of a digital system, two or more processors can be interconnected. For example, a DSP may be interconnected with a general-purpose processor in a digital system. The DSP performs numeric intensive signal processing algorithms while the general-purpose processor manages overall control flow. The two processors communicate and transfer data for signal processing via shared memory. A direct memory access (DMA) controller is often associated with a processor in order to take over the burden of transferring blocks of data from one memory or peripheral resource to another and to thereby improve the performance of the processor.

While, formerly, computer systems operated on a single application at one time, computer systems of today generally have several applications loaded into their main memories. The scheduling of multiple applications, running in parallel for the user, is managed by an operating system (OS). Most modern operating systems are designed with the concept of a virtual environment. Addresses coming from the processor are virtual addresses that map to actual ("physical") addresses in main memory.

For these multi-tasking systems, an important constraint is the context switch. The context switch corresponds to the necessary sequence of actions that the OS needs to execute in order to accommodate several independent tasks on a single processor. The context switch is a limiting factor on the performance in systems with strong real-time requirements, because it takes a significant time and number of instructions to realize the context switch.

Multitasking systems in a virtual environment must deal with "aliasing" of data which can occur when two or more different tasks cache data associated with the same physical address at two or more respective locations in the cache in accordance with the different virtual addresses used by the various tasks. When one task changes the value associated with a cached data item, that change will not be reflected in the cache locations of other virtual addresses that point to the same physical memory address. As part of a context switch, the operating system must invalidate the content of the cache so that other tasks will see the new value.

It is also beneficial to clean the cache, or a portion of the cache, in order to load in a new task in order to minimize processing delay due to "miss" processing.

The cleaning function associated with invalidating the cache can be very time consuming. Further, the cleaning function may be interrupted only at discrete time intervals, depending upon the cache cleaning design. For many applications that have tight real-time constraints, it is important that interrupts be allowed frequently. However, cleaning routines that have capacity to allow interrupts at frequent intervals often are the least efficient in completing the cleaning operation.

SUMMARY OF THE INVENTION

Particular and preferred aspects of the invention are set out in the accompanying independent and dependent claims. In accordance with a first embodiment of the invention, a method is provided for cleaning a range of addresses in a storage region specified by a start parameter and an end parameter. An interruptible clean instruction can be executed in a sequence of instructions in accordance with a program counter. If an interrupt is received during execution of the clean instruction, execution of the clean instruction is suspended before it is completed. After performing a context switch, the interrupt is serviced. Upon returning from the interrupt service routine, execution of the clean instruction is resumed by comparing the start parameter and the end parameter provided by the clean instruction with a current content of a respective start register and end register used during execution of the clean instruction. If the same, execution of the clean instruction is resumed using the current content of the start register and end register. If different, execution of the clean instruction is restarted by storing the start parameter provided by clean instruction in the start register and by storing the end parameter in the end register. In this manner, no additional context information needs to be saved during a context switch in order to allow the clean instruction to be interruptible.

In another embodiment of the invention, an interruptible instruction is provided that performs a sequence of operations other than a cleaning operation.

In another embodiment of the invention, an interruptible instruction is provided that is also re-entrant. During service of the interrupt, another sequence of instructions is executed that contain another copy of the interruptible instruction. In this event, a second copy of the interruptible instruction is executed while execution of a first copy of the interruptible instruction is suspended.

Another embodiment of the invention is a digital system, such as a personal digital assistant, that provides such an interruptible instruction.

BRIEF DESCRIPTION OF THE DRAWINGS

Particular embodiments in accordance with the invention will now be described, by way of example only, and with reference to the accompanying drawings in which like reference signs are used to denote like parts and in which the Figures relate to the digital system of FIG. 1 and in which:

FIG. 7 is a timing diagram illustrating operation of an instruction execution pipeline of a processor;

FIG. 8 is a flow chart illustrating interrupt operation in a processor having the instruction execution pipeline of FIG. 7;

Corresponding numerals and symbols in the different figures and tables refer to corresponding parts unless otherwise indicated.

DETAILED DESCRIPTION OF EMBODIMENTS OF THE INVENTION

Although the invention finds particular application to Digital Signal Processors (DSPs), implemented, for example, in an Application Specific Integrated Circuit (ASIC), it also finds application to other forms of processors. An ASIC may contain one or more megacells which each include custom designed functional circuits combined with pre-designed functional circuits provided by a design library.

Figure 1:
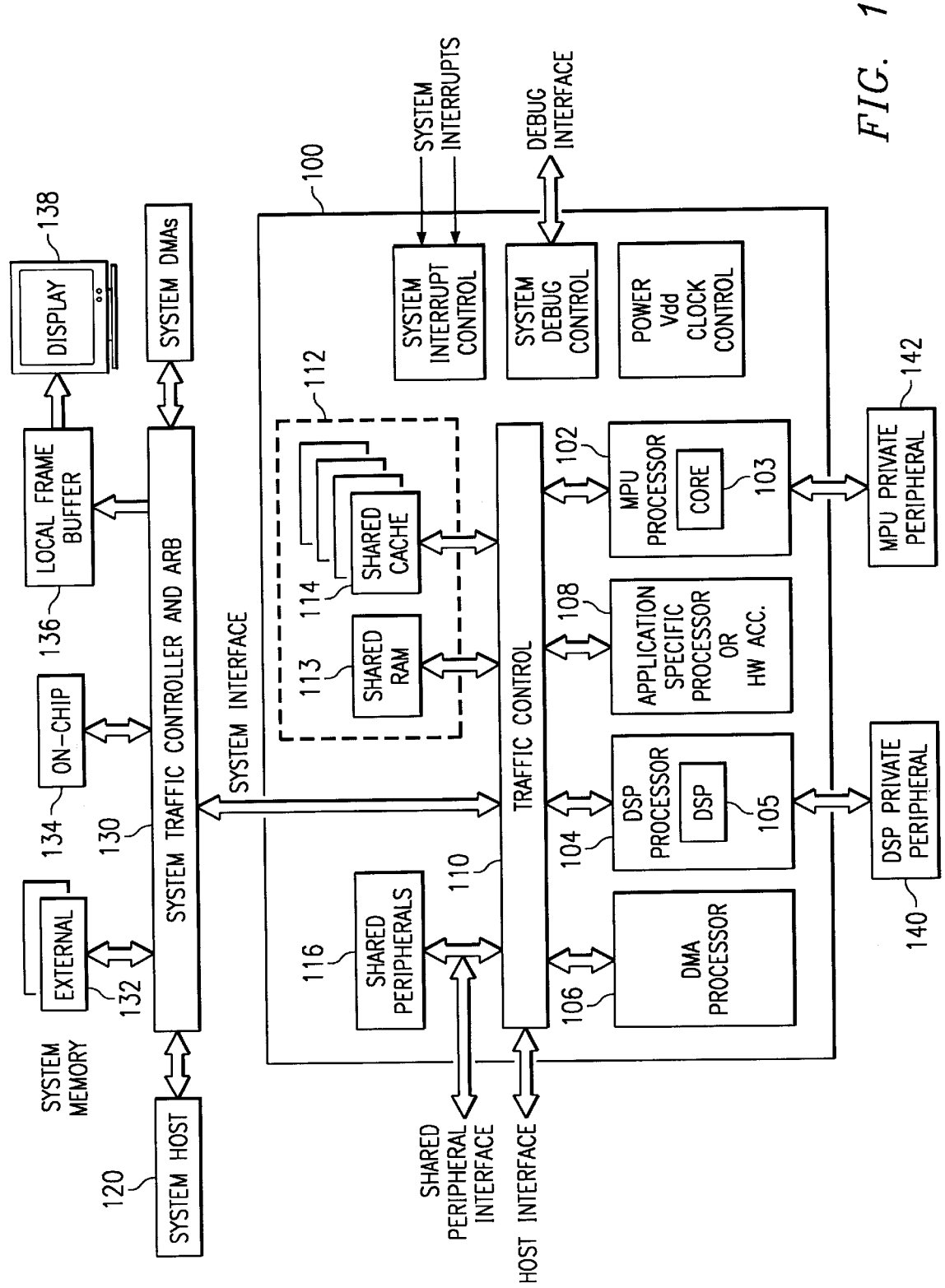
FIG. 1 is a block diagram of a digital system that includes an embodiment of the present invention in a megacell core having multiple processor cores.

FIG. 1 is a block diagram of a digital system that includes an embodiment of the present invention in a megacell core 100 having multiple processor cores. In the interest of clarity, FIG. 1 only shows those portions of megacell 100 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail. U.S. Pat. No. 5,329,471 issued to Gary Swoboda, et al, describes in detail how to test and emulate a DSP. Details of portions of megacell 100 relevant to an embodiment of the present invention are explained in sufficient detail herein below, so as to enable one of ordinary skill in the microprocessor art to make and use the invention.

Referring again to FIG. 1, megacell 100 includes a control processor (MPU) 102 with a 32-bit core 103 and a digital signal processor (DSP) 104 with a DSP core 105 that share a block of memory 113 and a cache 114, that are referred to as a level two (L2) memory subsystem 112. A traffic control block 110 receives transfer requests from a memory access node in a host processor 120, requests from control processor 102, and transfer requests from a memory access node in DSP 104. The traffic control block interleaves these requests and presents them to the shared memory and cache. Shared peripherals 116 are also accessed via the traffic control block. A direct memory access controller 106 can transfer data between an external source such as off-chip memory 132 or on-chip memory 134 and the shared memory. Various application specific processors or hardware accelerators 108 can also be included within the megacell as required for various applications and interact with the DSP and MPU via the traffic control block.

External to the megacell, a level three (L3) control block 130 is connected to receive memory requests from internal traffic control block 110 in response to explicit requests from the DSP or MPU, or from misses in shared cache 114. Off chip external memory 132 and/or on-chip memory 134 is connected to system traffic controller 130; these are referred to as L3 memory subsystems. A frame buffer 136 and a display device 138 are connected to the system traffic controller to receive data for displaying graphical images. Host processor 120 interacts with the resources on the megacell via system traffic controller 130. A host interface connected to traffic controller 130 allows access by host 120 to megacell 100 internal and external memories. A set of private peripherals 140 are connected to the DSP, while another set of private peripherals 142 are connected to the MPU.

Figure 2A:
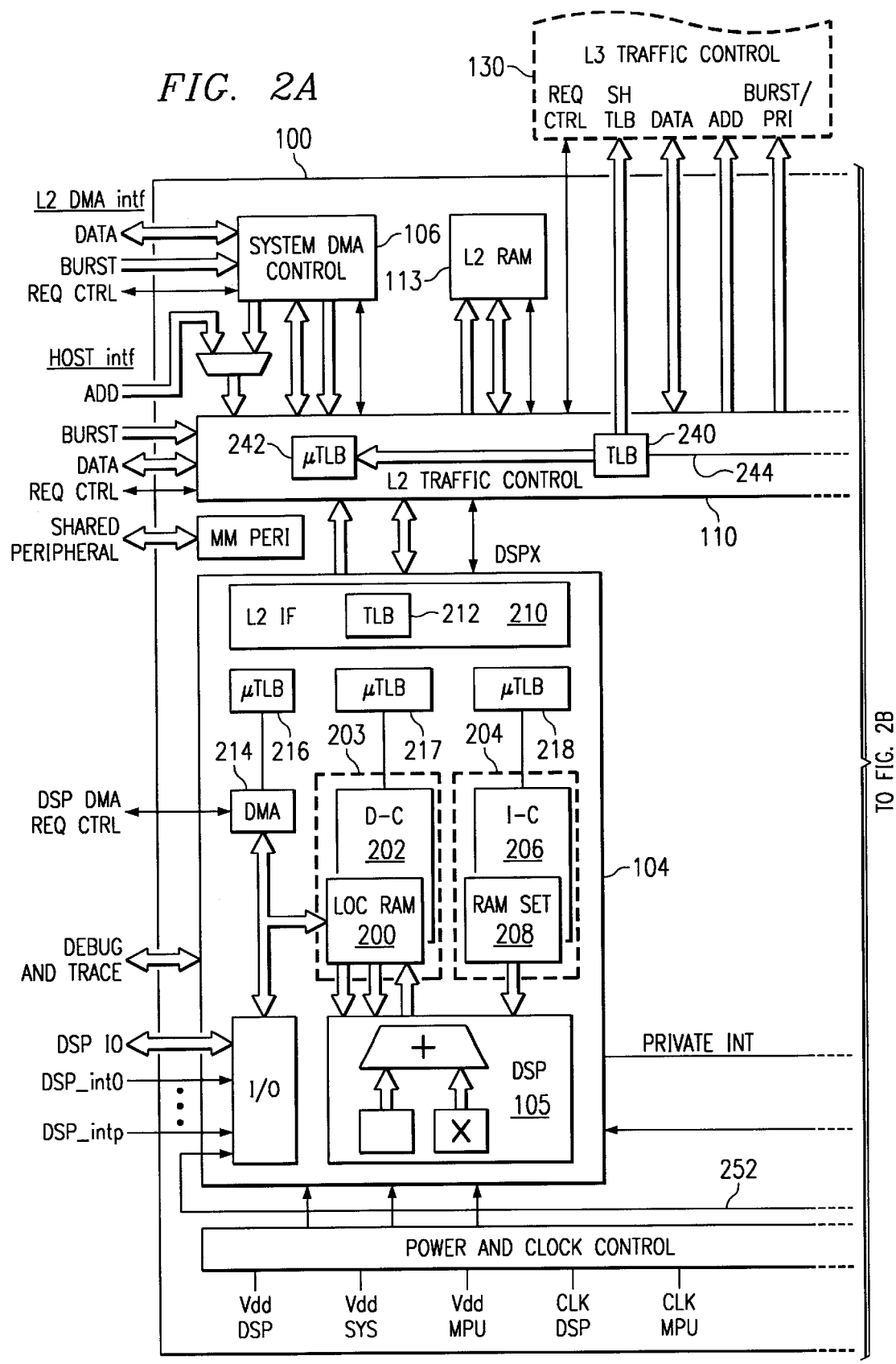
FIGS. 2A and 2B together is a more detailed block diagram of the megacell core of FIG. 1.
Figure 2B:
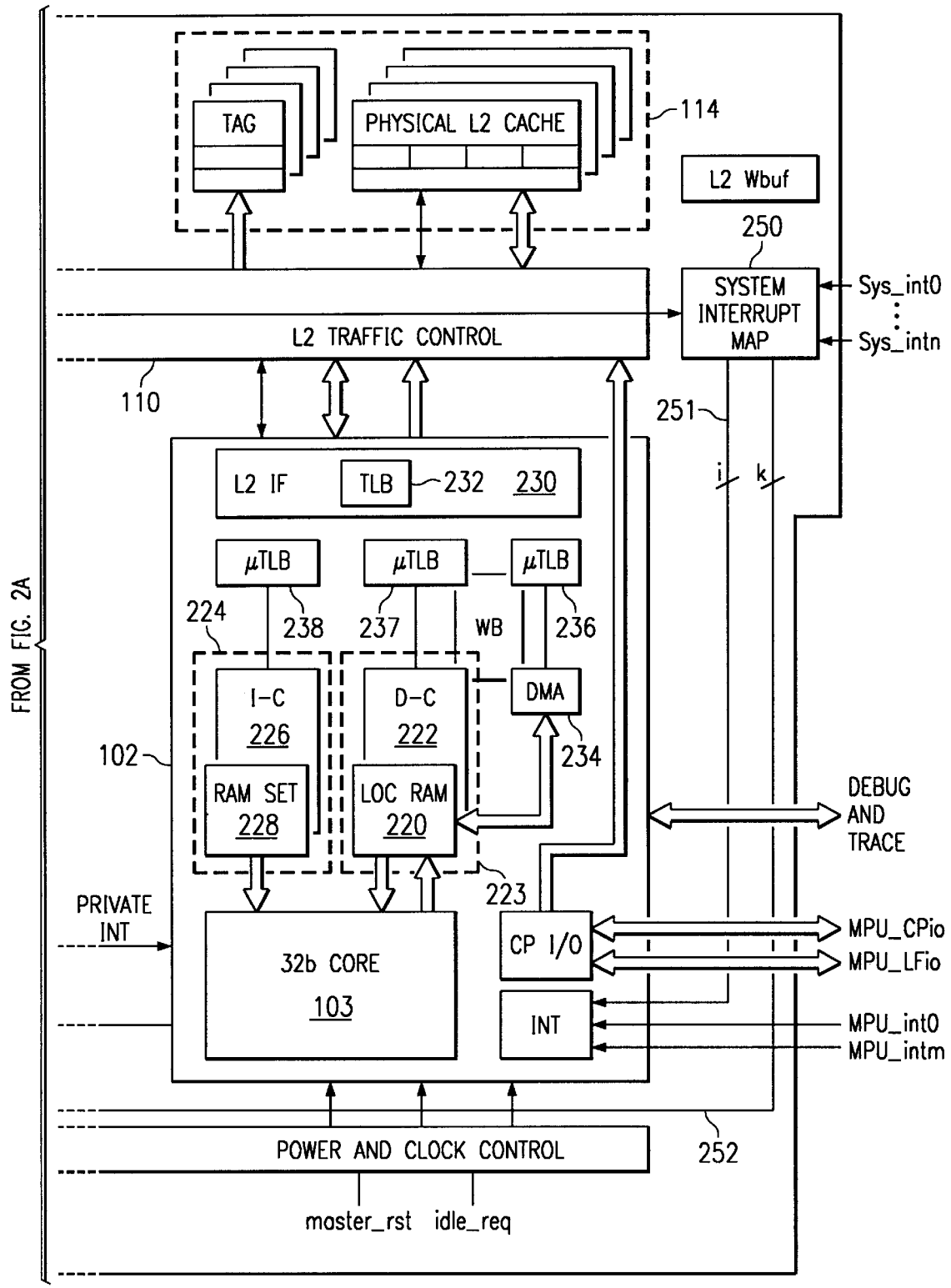

FIG. 2, comprised of FIG. 2A FIG. 2B together, is a more detailed block diagram of the megacell core of FIG. 1. DSP 104 includes a configurable cache 203 that is configured as a local memory 200 and data cache 202, and a configurable cache 204 that is configured as instruction cache 206 and a RAM-set 208, which are referred to as level one (L1) memory subsystems. The DSP is connected to the traffic controller via an L2 interface 210 that also includes a translation look-aside buffer (TLB) 212. A DMA circuit 214 is also included within the DSP. Individual micro TLBs ($\mu$TLB) 216–218 are associated with the DMA circuit, data cache and instruction cache, respectively.

Similarly, MPU 102 includes a configurable cache 223 that is configured as a local memory 220 and data cache 222, and a configurable cache 224 that is configured as instruction cache 226 and a RAM-set 228, again referred to as L1 memory subsystems. The MPU is connected to traffic controller 110 via an L2 interface 230 that also includes a TLB 232. A DMA circuit 234 is also included within the MPU. Individual micro TLBs ($\mu$TLB) 236–238 are associated with the DMA circuit, data cache and instruction cache, respectively.

L2 traffic controller 110 includes a TLB 240 and a micro-TLB ($\mu$TLB) 242 that is associated with system DMA block 106. Similarly, L3 traffic controller 130 includes a $\mu$TLB controllably connected to TLB 232 that is associated with system host 120. This $\mu$TLB is likewise controlled by one of the megacell 100 processors.

Memory Management Unit

At the megacell traffic controller level, all addresses are physical. They have been translated from virtual to physical at the processor sub-system level by a memory management unit (MMU) associated with each core, such as DSP core 105 and MPU core 103. At the processor level, access permission, supplied through MMU page descriptors, is also checked, while at the megacell level protection between processors is enforced by others means, which will be described in more detail later.

The TLB caches contain entries for virtual-to-physical address translation and access permission checking. If the TLB contains a translated entry for the virtual address, the access control logic determines whether the access is permitted. If access is permitted, the MMU generates the appropriate physical address corresponding to the virtual address. If access is not permitted, the MMU sends an abort signal via signal group 244 to MPU 102.

Upon a TLB miss, i.e., the TLB does not contain an entry corresponding to the virtual address requested, translation table walk software retrieves the translation and access permission information from a translation table in physical memory. Once retrieved, the page or section descriptor is stored into the TLB at a selected victim location.

Shared Cache and RAM

Referring again to FIG. 1, Megacell 100 includes large shared memory subsystem 112 that functions as a secondary level of RAM (L2 RAM) 113 and cache (L2 Cache) 114. This level of memory is preferably called the outer level, as each processor in various embodiments may have multilevel internal memory. However, for the present embodiment, processors 102, 104 have one level of internal memory, which is referred to herein as L1 within the memory hierarchy, therefore the outer level memory subsystem will be referred to as level two (L2). The megacell outer memory 112 is organized as what's called a SmartCache, which is a configurable cache and which allows concurrent accesses on cache and RAM-set. RAM-set is a block of RAM that has aspects of cache behavior and cache control operations as well as DMA capability. The SmartCache architecture provides predictable behavior and enhanced real-time performance while keeping high flexibility and ease of use. A detailed description of a SmartCache is provided in U.S. Pat. application Ser. No. 09/591,537, entitled Smart Cache. Advantageously, RAM-set configured as a RAM offers fast memory scratchpad feature.

Megacell "outer" memory 112 can be shared between megacell internal processors and external Host processors or peripherals. RAM usage can also be restricted to the usage of a single processor thanks to the MMU mechanism, described earlier. However, in another embodiment a need might arise in the megacell to add additional physical protection per processor on some part of megacell memory to overwrite the MMU intrinsic protection.

A unified shared cache architecture of this embodiment is a four way set associative cache with segmented lines to reduce system latency. All outer memories are treated as unified instruction/data memory to avoid compiler restrictions such as data in program space or vice-versa. Size of this cache or the degree of associativity is a design choice and may vary in other embodiments of the present invention. General construction of set-associative caches are known and need not be described in detail herein. Typically, L1 caches are 16 kbytes or 32 kbytes, and the L2 cache is 128 kbytes, 256 kbytes or larger, for example. Likewise, the number of associated RAM-sets may vary in other embodiments.

Cache Features

The unified cache memory of the present embodiment supports write back, and write through with/without write-allocate on a page basis. These controls are part of the MMU attributes. Hit under miss is supported to reduce conflicts between requesters and consequent latency. Concurrent accesses on RAM-sets and cache are supported.

Referring again to FIG. 2B, on a cache miss, the segment corresponding to the miss is fetched from external memory first. Each data array in each cache has a number of lines that are segmented into four segments that each hold 16 bytes data or instruction. For example, in L1 cache 224 if a miss occurs in second segment, the second segment is fetched from second level RAM 113 or cache 114 or from third level memory 132, 134 if the second level misses. Then, the third segment and finally the fourth segment are loaded automatically, referred to as automatic hardware prefetch. In this embodiment, the first segment is not loaded into the cache in this situation. This sequence of loads can be interrupted on a segment boundary by a miss caused by a request having higher priority. The interrupted load is not resumed, as the remaining segments will be loaded if required later in response to a new miss.

Likewise, second level cache 114 has a data array with a number of lines that are segmented into four segments that each hold 16 bytes. If second level cache 114 misses, it will be filled from third level memory 132, 134 using a multi-cycle operation in which each segment of a given line is accessed. Multi-cycle operations on second level cache 114 are non-blocking. A Multi-cycle cache operation is launched and a status bit indicates its completion. As operations can be initiated by several requesters, such as DSP 104 and MPU 102, these operations can not be blocking due to real time constraints. If one processor initiates a clean_all_task_ID or a block operation for example, other requests can interleave.

Each cache segment has an individual valid bit (VI) and an individual dirty bit (DI) in the respective tag array. On a write back when a line is replaced, only the segments with modified (dirty) data are written back. Each RAM-set segment has a valid bit (VI) in the respective tag array.

In this embodiment, L1 caches 202, 206, 222, 226 and L2 cache 114 are organized as 4-way set associative caches. A random cache replacement strategy has been chosen for the replacement algorithm of the 4-way set associative caches. In this embodiment, the caches do not support cache entry locking except through the RAM-set.

Table 1 includes a listing of the various cache and RAM control operations that can be invoked by the processors in the megacell of the present embodiment. In this embodiment, all operations on an entry operate on segments; there are four segments per entry in the L2 cache, as discussed above. When applied to L1 caches which are segregated into a data cache and a separate instruction cache, then the flush, clean and prefetch operations are directed to the type of information contained in the targeted cache. This means that a way is provided to identify on which cache, instruction or data, a command such as flush applies.

In one embodiment, a state machine in cache controller circuitry associated with each cache executes a requested control operation, as indicated by a control word. In another embodiment, the control operations can be invoked by executing an instruction that invokes a hardware or software trap response. As part of this trap response, a sequence of instructions can be executed or a control word can be written to selected address, for example. In another embodiment, one of the processors may include instruction decoding and an internal state machine(s) to perform a TLB or Cache control operation in response to executing certain instructions which may include parameters to specify the requested operation.

TABLE 1

Cache and RAM Control Operations
(C: operation on the cache, RS: operation on RAM-set, R: operation on RAM)

| Function | | Software view (memory mapped/co-proc) |
|---|---|---|
| Flush_entry (address) | C/RS | Flush the entry, whose address matches the provided |
| flush_range(start,end). | C/RS | Flush all entries whose address is within the address range (start-end) |
| Flush_all_entry_of_task_ID(task_ID) | C | Flush all entries matching to the current taskID in the cache but not in the RAM-set |
| Flush_all_entry_of_R_ID (task_ID) | C | Flush all entries matching to the current R_ID in the cache but not in the RAM-set |
| Flush_all | C | Flush all entries in the cache but not in RAM-set |
| Flush_all_shared | C | Flush all entries marked as shared |
| Flush_all_task_ID_shared(task_ID) | C | Flush all entries matching the current taskID and marked as shared |
| Flush_all_task_ID_not_shared (task_ID) | C | Flush all entries matching the current taskID and marked as not shared |
| Clean_entry (address) | C/RS | Clean the entry, whose address matches the provided address |
| clean_range(start,end), | C/RS | Clean all entries whose address is within the address range (start-end) |
| Clean_all_entry_of_taskID(task_ID) | C | Clean all entries matching to the current taskID in the cache but not in the RAM-set |
| Clean_all_entry_Of_R_ID(task_ID) | C | Clean all entries matching to the current R_ID in the cache but in the RAM-set |
| Clean_all | C | Clean all entries in the cache but not in RAM-set |
| Clean_all_shared | C | Clean entries marked as shared |
| Flush_all_task_ID_shared(task_ID) | C | Flush all entries matching the current taskID and marked as shared |
| Clean_all_taskID_not_shared(Task_ID) | C | Clean all entries matching the current taskID and marked as not shared |
| Clean&Flush_single_entry(address) | C/RS | Clean and flush the entry[1], whose address matches the provided address |
| Clean&flush_range(start,end), | C/RS | Clean and flush all entries whose address is within the address range (start-end) |
| Clean&flush_all_entry_of_taskID (Task_ID) | C | Clean and flush all entries matching to the current taskID in the cache but not in the RAM-set |
| Clean&flush_all_entry_of_R_ID(Task_ID) | C | Clean and flush all entries matching to the current R_ID in the cache but not in the RAM-set |
| Clean&flush_all | C | Clean and flush all entries in the cache but not in RAM-set |
| Clean&flush_all_shared | C | Clean and flush entries marked as shared |
| Clean&flush_all_taskID_shared(task_ID) | C | Clean and flush all entries matching the current taskID and marked as shared |
| Clean&flush_all_taskID_not_shared (task_ID) | C | Clean and flush all entries matching the current taskID and marked as not shared |
| Set_RAM_Set_Base_addr(RAM-setID) | RS/R | Set new RAM-set base address. set VG and clear all VI and set End to last RAM-set address by default preparing the full RAM-set loading. In that case no need to write the END address before writing the start address to load the RAM-set |
| Set_End_Addr (address) | C/RS | Set end address of the next block load and set the RAM-set controller in block fill mode. |
| Set_start_addr (address) | C/RS | Set start address of a block and initiates the loading of this block |
| Prefetch-entry(address | C/RS | Prefetch-the entry, whose address matches the provided address or a Range of address if End has been set previously. Prefetch-range instruction is made of two consecutive instructions Set_End_addr(address) + Prefetch_entry (address) |
| Flush_RAM-set (RAMset_ID) | RS/R | Clear VG and all VI of the selected RAM-set |

Detailed Aspects

Various aspects of the digital system of FIG. 1 will now be described in more detail.

As discussed earlier, a block operation can be performed to load, to clean, or to flush (invalidate) a portion of the cache or RAM-set. Cleaning a cache requires that all locations marked as dirty must be written back to the main memory 132, 134. Consequently, the time to execute this operation depends upon the size of the cache memory. Common cache sizes of a few kilobytes require a few tens of thousands of cycles for the cleaning operations. In the past, cache cleaning operations were generally invoked only by an operating system; therefore the occurrence of a clean operation could be handled in an orderly manner. It is now envisioned that a clean operation can be invoked by an application task on an as needed bases. Therefore, it is even more imperative to provide a clean operation that is efficient and that does not impede real-time tasks.

One solution is to use a hardware clean operation whereupon the cache is cleaned responsive to a specific instruction. For an eight kilobyte cache and a main memory operating at 100 MHz, for example, a hardware clean operation may last as long as 80 microseconds if all cache locations are dirty or it can be significantly less if only a few locations are dirty. During the time of the cleaning operation, however, interrupts are disabled and the latency of the interrupt is proportional to the cache size. In real-time systems where interrupts must be dealt with immediately, the worst case latency can be excessive and noticeably affect the operation of the device.

Figure 3:
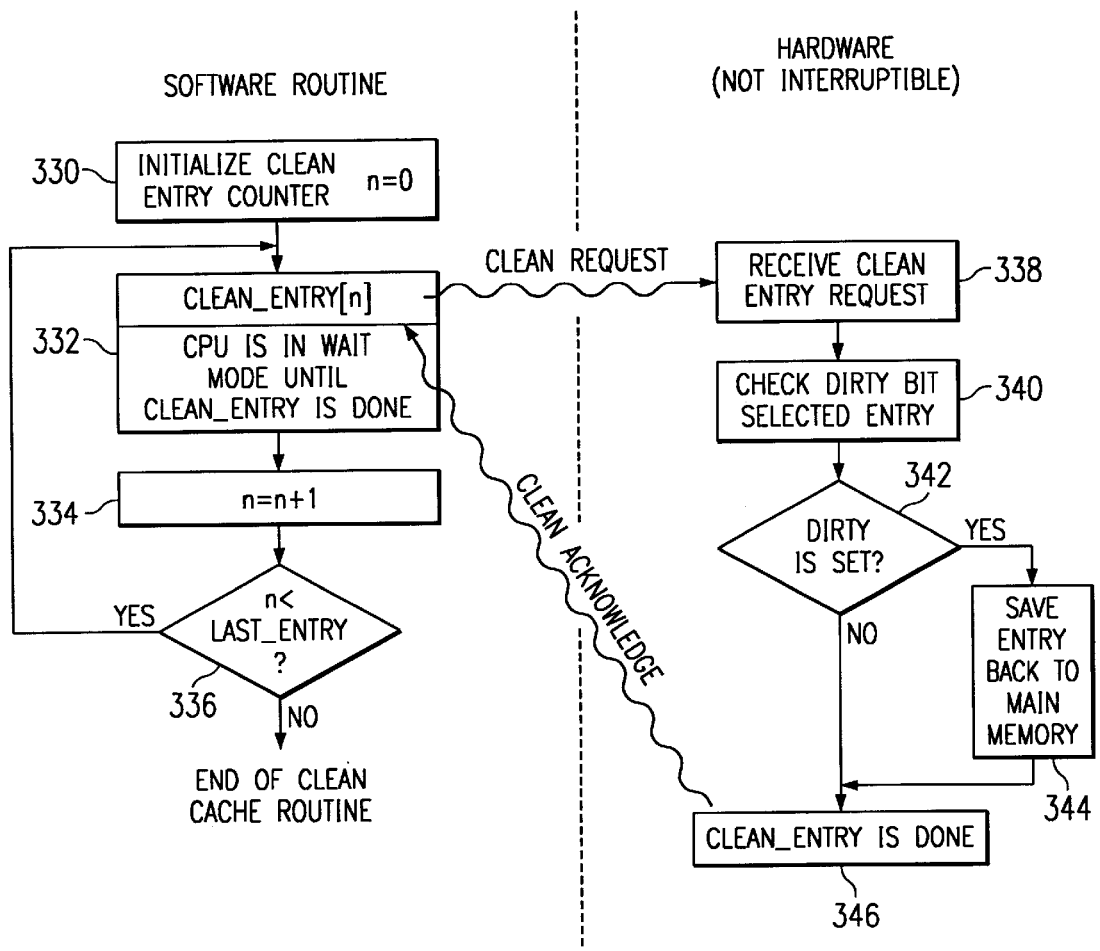
FIG. 3 is a flow chart depicting a prior art software solution for cleaning a cache.

FIG. 3 is a flow chart depicting a prior art software solution for cleaning the cache. In step 330, counter n is initialized to n=0. In block 332, the clean entry command is issued, which causes a hardware clean operation for a single cache memory address. The hardware clean function, which is not interruptible, cleans a block of memory associated with an entry in the tag array corresponding to the value of counter n. The processor is in a wait mode while the cleaning of a block is performed. After the clean function on the block is performed, the counter n is incremented in block 334 and, if n has not reached the last entry in the tag memory (block 336), the steps of blocks 332 and 334 are repeated.

The hardware clean function works as shown in blocks 338 through 340. In block 338, the "clean entry" request is received from the software (block 332). In response to the request, the dirty bit corresponding to tag memory address n is checked to see if it is dirty (block 340). If the dirty bit is set in decision block 342, then the corresponding information in the cache data array at location n is copied to main memory at the physical address corresponding to the virtual address stored in the corresponding tag memory at location n. Thus, for location n=N2, since the dirty bit is set, the data in data memory at location N2 would be written to physical address PA1. After the entry is saved to main memory, or if the dirty bit was not set in decision block 342, the clean function is complete in block 346 and control returns to the software routine.

The software routine in FIG. 3 (i.e., blocks 330–336) can be interrupted between any atomic operation. The hardware routine is not interruptible and, therefore, there can be a delay of the order of a few tens of cycles while the hardware routine executes, which is generally acceptable for real-time systems. The main problem with a software cleaning function is that the time required to process the software steps needed to clean a large number of cache locations is excessive, significantly increasing the time required for a context switch.

A second implementation is described in connection with French Patent Application No. 9805420, filed Apr. 29, 1998 and U.S. Ser. No. 09/187,118, filed Nov. 5, 1998, now U.S. Pat. No. 6,321,299 entitled "Computer Circuits, Systems, and Methods Using Partial Cache Cleaning" to Chauvel et al, assigned to Texas Instruments Incorporated, which are incorporated by reference herein. In this implementation, information on the uppermost dirty cache location is maintained in order to reduce the number of cache locations that must be cleaned in a hardware clean function. While this architecture improves on the average performance of a hardware clean operation, it does not resolve the real-time issue for worst-case scenarios (a wide range of cache blocks dirty) because the hardware operation remains uninterruptible.

Figure 4:
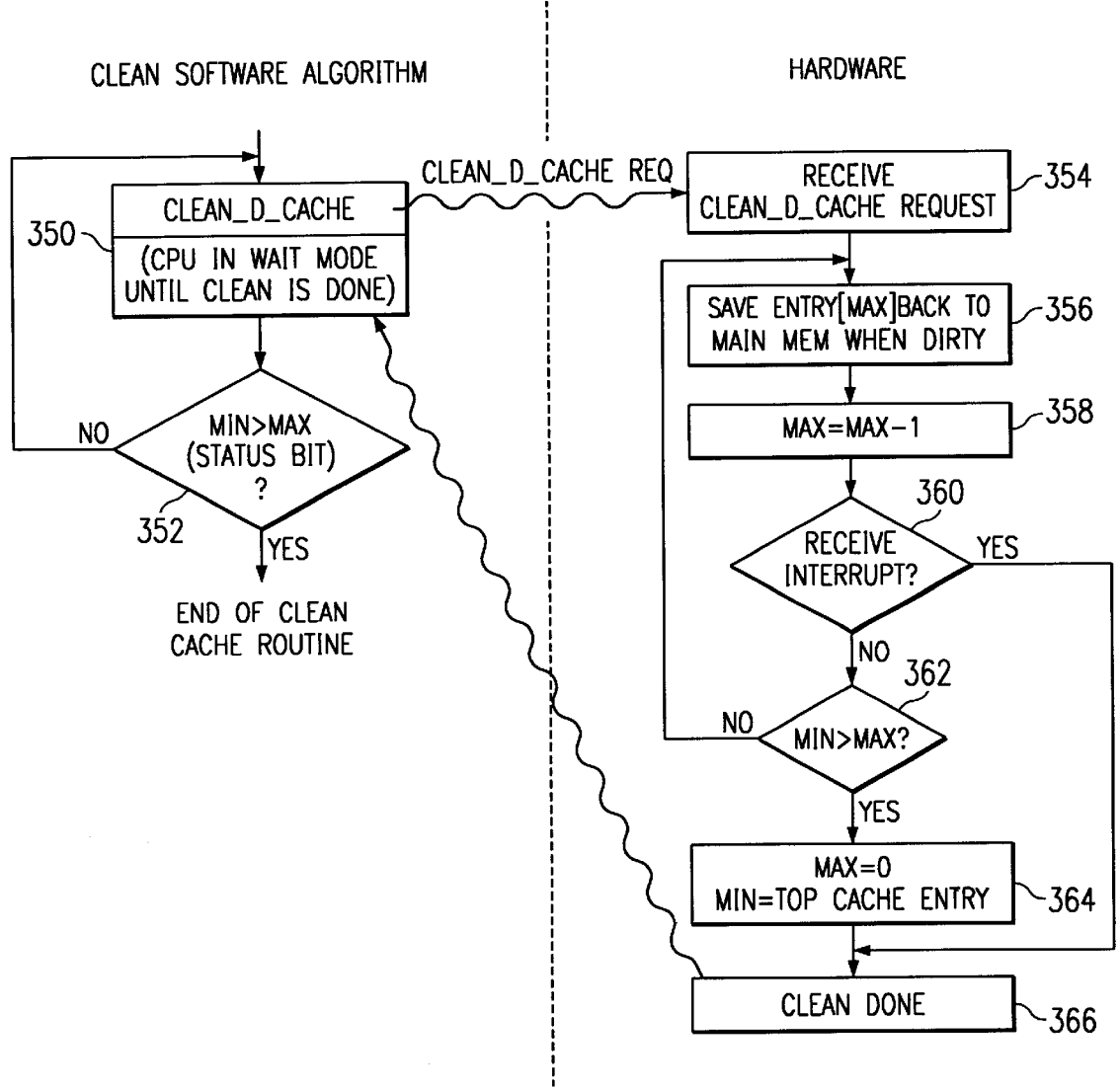
FIG. 4 is a flow chart describing operation of an interruptible hardware clean operation.

FIG. 4 illustrates a flow chart describing operation of an interruptible hardware clean operation that is also described in European Patent Application No. 99400396.0, filed Feb. 18, 1999 and U.S. Ser. No. 09/447,194, filed Nov. 22, 1999, now U.S. Pat. No. 6,606,687 entitled "Optimized Hardware Cleaning Function For VIVT Data Cache" to Chauvel et al, assigned to Texas Instruments Incorporated, which are incorporated by reference herein. The hardware includes a MIN register and a MAX counter. Initially, MIN is set to the highest cache location and MAX is set to the "0". As dirty bits are set in the tag memory, the MIN register is loaded with the address (n) of the dirty tag location if n<MIN and MAX is set to the address of the dirty tag location if n>MAX. MIN and MAX thus define the smallest range of addresses in the cache that includes all dirty locations. A MIN>MAX status bit indicates whether the address in the MIN register is greater than the address in the MAX counter at any given time. The MIN>MAX bit can be the most significant bit, the sign bit, of a status register for easy determination of whether the bit is set.

During a context switch, or at other times where a cache clean is necessary, software initiates a hardware clean function in block 350. The CPU is in wait mode until the cleaning control returns from the hardware clean function. As will be described in greater below, the hardware cleaning routine is interruptible and will return control to the software if there is an interrupt or if the clean operation is complete. After the "end" of the hardware clean function, which can occur if there is an interrupt or when all dirty cache locations have been written to main memory, flow continues to block 352, the software checks to see if the MIN>MAX status bit is set. If so, this indicates that the cleaning operation is complete or that there were no dirty cache locations to clean when the hardware clean operation was invoked; in either case, the context switch may continue. If MIN>MAX is not set, then the hardware cleaning operation was interrupted, and control returns to block 350, where the hardware cleaning function is continued.

The hardware cleaning function is described in connection with blocks 354–366. In block 354, the cache cleaning request is received by the hardware cleaning function. In block 356, the cache entry indicated by counter MAX is saved to main memory if the dirty bit associated with the cache entry is set. In block 358, MAX is decremented.

At this point, as shown by decision block 360, any pending interrupts may be serviced. If an interrupt has not been received, decision block 362 returns to save the next entry in block 356 if MIN is still less than or equal to MAX. If MIN is greater than MAX, i.e., if the MIN>MAX status bit is set, then the cleaning operation is complete. In this case, the MIN and MAX registers are returned to their default settings (MAX=0, MIN=top cache entry) in block 364, the clean operation is complete in block 366 and control returns to the software routine in block 352.

Returning to decision block 360, if an interrupt has been received at this point, the flow is directed to block 366, where the clean operation is temporarily complete and control returns to the operating system software to service the interrupt. After the interrupt has been serviced, decision block 352 determines whether the MIN>MAX status bit is set. If the bit is not set, then the cleaning operation did not clean all dirty cache entries due to an interrupt. The hardware clean cache instruction is re-invoked, where it will start with the current value of MAX and continue to count down until either another interrupt occurs or until MIN is greater than MAX.

The cache cleaning method described by FIG. 4 provides significant advantages over the prior art. First, the implementation has the benefit of the speed of a hardware cache instruction; after the initial invocation of the hardware clean operation, software is involved only if an interrupt occurs. On the other hand, the hardware cleaning operation may be interrupted as it cycles through the cache entries, allowing the system to respond to interrupts as necessary for real-time requirements. Third, the number of cache entries is optimized to service only the range of cache entries which have associated dirty bits.

However, in the embodiment of FIG. 4, one or more instructions are used in block 350 to initiate a clean operation and an additional one or more instructions are used in block 352 to determine it the cleaning operation was interrupted. Normal interrupt context switch processing causes the first instruction of block 352 to be executed after returning from an interrupt of the cleaning operation.

Figure 5:
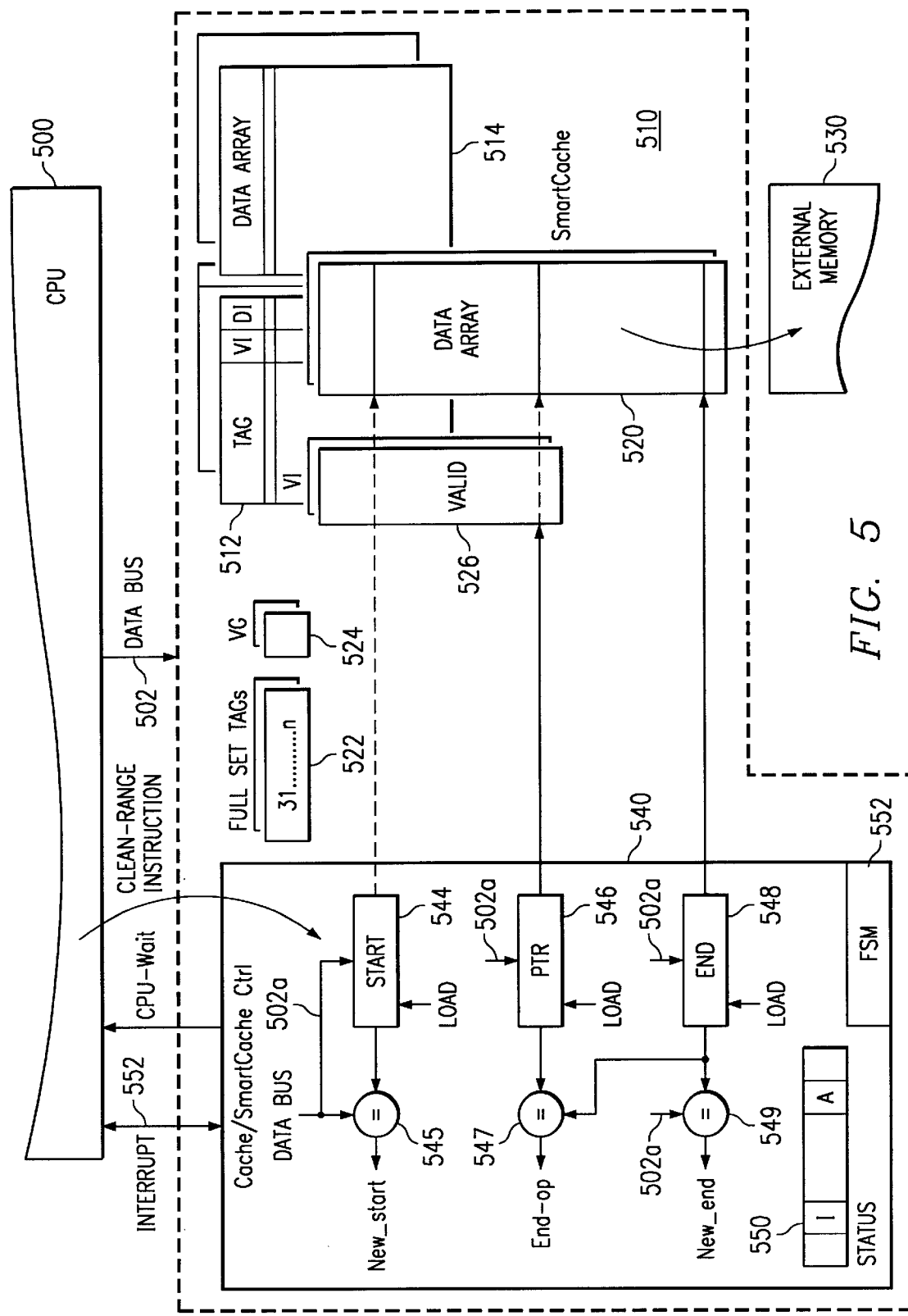
FIG. 5 is a block diagram of control circuitry for performing an interruptible clean operation in the cache of the digital system of FIG. 1.

FIG. 5 is a block diagram control circuitry for performing an interruptible clean operation in a cache of the digital system of FIG. 1. In this figure, processor 500 is representative of either of processors 102, 104; memory subsystem 510 is representative of any of Cache/RAM Sets 112, 113, 203, 204, 223, or 224; and memory 530 is representative of L2 or L3 on-chip RAM 134 or off-chip RAM 132.

Within subsystem 510, a cache representative of shared cache 112, for example, includes tag array 512 with individual valid bits (VI) and individual dirty bits (DI) for each respective segment in data array 514. A RAM set representative of RAM set 113, for example, includes Tag register 522, global valid bit 524, and individual valid and dirty bits 526 for each respective line in data array 520.

Control circuitry 540 is shared between both the cache portion and RAM-set portion of subsystem 510. As described above, there is a start register 544 and an end register 548 that is loaded via data bus 502a which connects to data bus 502 from processor 500. These two registers are loaded with start and end parameters for block operations, such as clean or load. A third register, pointer register 546, is also loaded with the start parameter when start register 544 is loaded. During a block operation, pointer register 546 is incremented as the block operation proceeds, while start and end registers maintain their original values. A block operation is complete when the value of pointer register 546 equals the value in end register 548, as indicated by comparator 547.

In the present embodiment, the start and end parameters are stored in two general-purpose registers in a register file of the processor prior to executing a clean instruction. The clean instruction then specifies these two general-purpose registers as source operands. Other embodiments may specify the initial parameters in a different manner, such as by including them as an immediate field as part of the instruction.

Status register 550 is a portion of a system status register associated with processor 500. Bit A and bit I are used in conjunction with interruptible operation of a block operation, which will now be described in more detail.

Figure 6A:
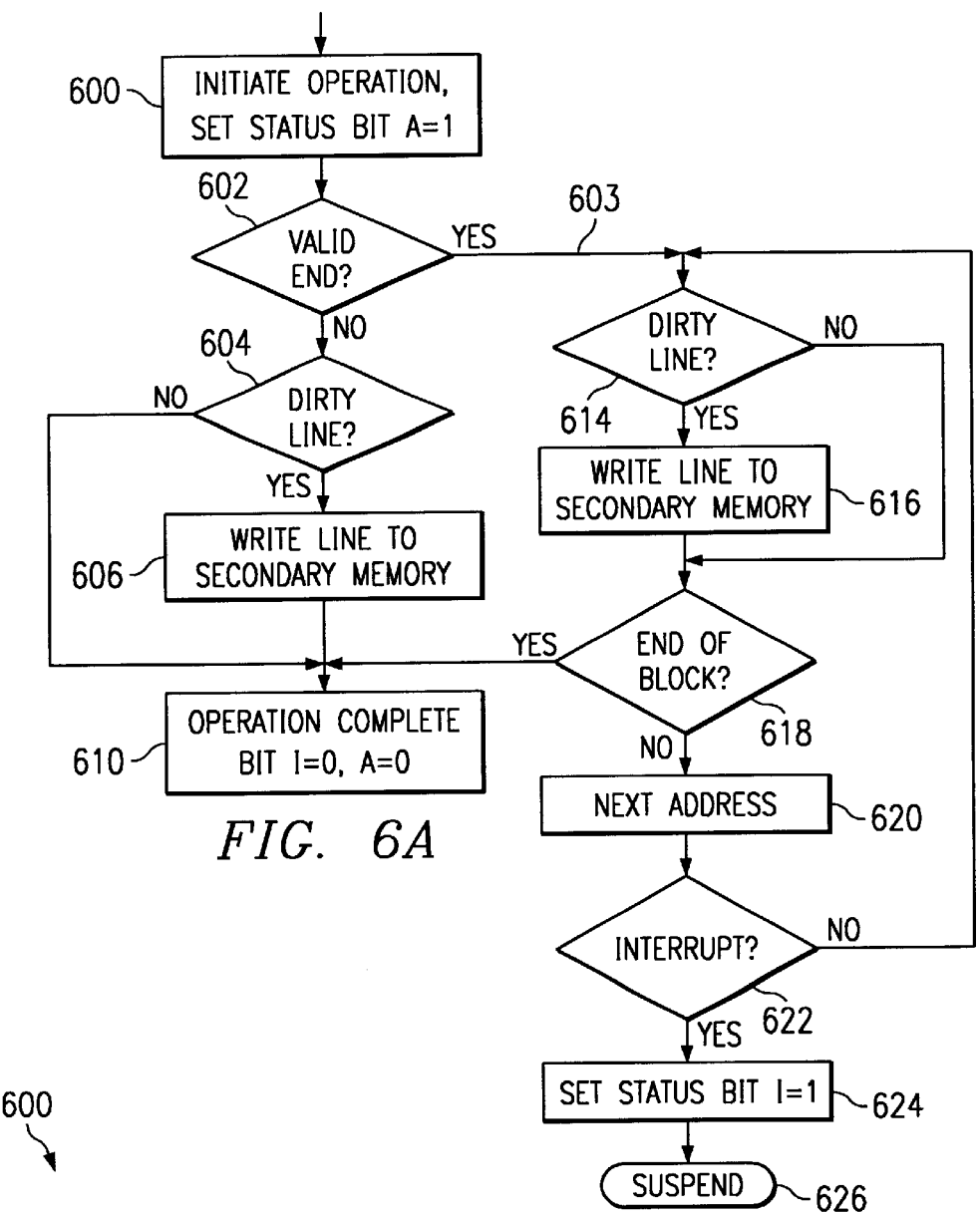
FIG. 6A is a flow chart describing operation of an interruptible and re-entrant clean instruction using the control circuitry of FIG. 5.

FIG. 6A is a flow chart describing operation of an interruptible and re-entrant instruction using the control circuitry of FIG. 5, according to aspects of the present invention. This description will be in terms of a clean instruction, but aspects of the present invention may also be embodied in other instructions that perform a sequence of operations, such as block loads, array processing, etc.

The clean-range operation provides parameters "start and end" to determine the range of the operation. These parameters are provided either via a 64-bit wide data bus simultaneously or sequentially through a 32-bit data bus. The setting of the range registers and the execution initialization of the Clean-range operation are always viewed from a software standpoint as atomic.

During step 600, a clean operation is initiated. When the clean-range instruction is executed, the A-bit in status register 550 is asserted to indicate that an interruptible instruction is being executed. In this embodiment, the A-bit is set during an instruction execution phase in an instruction execution pipeline when an interruptible instruction is executed. The A-bit remains asserted only while the interruptible instruction is being executed. The parameters of the clean-range instruction (start and end) are loaded into the respective start and Ptr registers and the end register.

In step 602, this embodiment of the invention performs a test after an operation is initiated in step 600. If end register 548 has not been loaded with an end of block address, then only a single line of the cache is cleaned, rather than a block. Step 604 checks a dirty bit associated with the address selected by the start register. As mentioned earlier, this embodiment has four dirty bits for each line. The start register and end register contain addresses that are line aligned, so all four dirty bits on each line are checked. If the dirty bit indicates the associated line contains dirty data, then the segments that have dirty data are written to secondary memory in step 606. If the line does not contain dirty data, then the operation is completed as indicated in step 610.

Another embodiment of the present invention may omit the feature illustrated by step 602 and instead only provide block operations, where a block operation may cover only a single line if start=end, for example.

Referring back to step 602, if end register 548 has been loaded with an end-of-block address, then a block operation is commenced, as indicated by arc 603. In this case, the block operation starts at an address provided by start address register 544 and reflected in pointer register 546. The block operation ends at the address provided by the end register.

In step 614 a check is made of a dirty bit associated with the address selected by the pointer register, a described for step 604. If the dirty bit(s) indicates the associated line contains dirty data, then that line or segments are written to secondary memory in step 616. If the line does not contain dirty data, then a write transaction is not required.

In step 618, a test is made to determine if the end of the block has been reached using the output of comparator 547, which compares pointer register 546 to end register 548. If they are equal, the block operation is completed at step 610. At the end of the clean-range operation (Ptr=end), the A-bit is cleared and the CPU resumes execution of the following instruction. Use of the A-bit will be discussed with reference to FIG. 8.

Referring again to step 618, if the end of the block has not been reached, then the next address is selected in step 620 by incrementing the pointer register and steps 614, 616, and 618 are repeated if an interrupt has not occurred, as determined in step 622. As discussed earlier, the start register is not changed during execution of the clean instruction.

In step 622, if an interrupt is pending, then the an interrupt bit (I) in system status register 550 is set in step 624 to indicate that execution of the interruptible clean instruction has been interrupted.

Finally, in step 626 the clean operation is suspended. The processor performs its normal interrupt response processing. Contrary to FIG. 4, where the return address value provided to the interrupt handler corresponds to step 352 (interrupt return PC is the address of the following instruction: test), in this case the address provided to the interrupt handler corresponds to the address of the initial operation step 600. This is described in more detail later by FIG. 8.

Figure 6B:
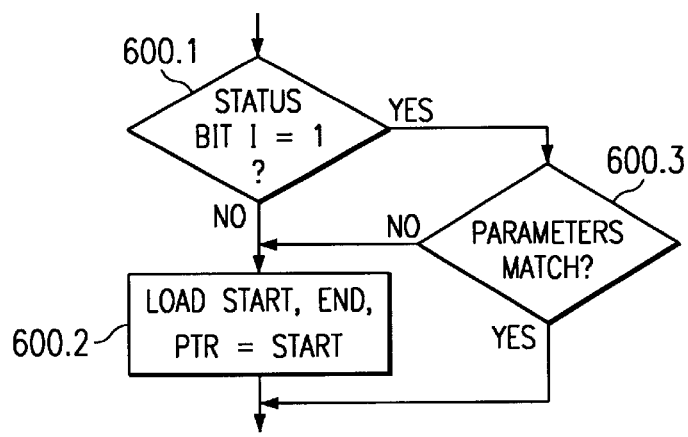
FIG. 6B is a more detailed flow chart illustrating initiation of operation of the clean instruction of FIG. 6A.

Referring now to FIG. 6B, initialization step 600 is illustrated in more detail. Each time a clean instruction begins to execute, the I-bit is tested in step 600.1. If the I-bit is not set, then the start and end parameters specified by the operand field of the instruction are loaded into the start register and end register, respectively in step 600.2. However, if the I-bit is set to indicate the clean instruction had been interrupted, then another test is done in step 600.3.

In step 600.3, the current contents of the start register and the end register are compared against the corresponding parameters specified by the clean instruction. If they match, this indicates finite state machine 552 and pointer register 546 that controls the clean operation are still in the same state as when the clean instruction was interrupted. Thus, execution of the suspended instruction is resumed at the same point at which it interrupted. On the other hand, if the parameters do not match, this indicates a change of state has occurred. In this case, the clean instruction is restarted by reloading the start and end register with the initial parameters in step 600.2.

In this manner, the clean instruction can usually resume operation from the point at which it was interrupted. Advantageously, if the periodicity of the interrupt is smaller than the time required to completely execute the clean range instruction, the execution does eventually complete rather than entering an infinite loop which could occur if the clean instruction was always restarted from the beginning after each interrupt.

Advantageously, no additional context need be saved during the context switch for the interrupt. Thus, the clean range instruction can be interrupted and resumed without increasing the time to perform a context switch.

Thus, a cache clean and/or a cache flush operation can be performed on a range of addresses in response to a software directive. A flush operation is performed in a similar manner. A flush simply invalidates each valid bit within the range selected by the start register and the end register. Essentially the same flow is used. In steps 604 and 614, the selected valid bit(s) are cleared regardless of the state of the associated dirty bits. Dirty bits are not checked and steps 606, 616 become irrelevant, since the state of the dirty bits doesn't matter during a flush and no data is written to secondary memory. Usually, a clean-range operation would have been done previously or the flush is done through a combined clean-and-flush-range operation as described below.

A clean and flush operation is also performed using the same flow. In this case, in steps 604 and 614, the selected valid bit(s) are cleared and the selected dirty bit(s) are checked. If a valid bit is in a valid state, it is also reset to an invalid state in steps 604, 614. If a dirty bit was asserted, the associated segment is written to secondary memory in step 606, 616.

FIG. 7 is a timing diagram illustration operation of an instruction execution pipeline of a processor. This instruction execution pipeline is representative of execution pipelines within the processors of FIG. 1. As is well known by those skilled in the design of microprocessors, an instruction execution pipeline is generally utilized in order to improve processing time. FIG. 7 illustrates three stages of such a pipeline: fetch, decode and execute. In the fetch stage, an instruction is fetched in accordance with an address stored in a program counter (PC). For example, during time period T1, and instruction is fetched from an address "n," where "n" is an instruction address contained in PC. The PC is then incremented by the size of the instruction and the next instruction of the sequence of instructions is fetched, such as an instruction located at address "n+4" in time period T2. In this example, each instruction is four bytes long, thus the byte address contained in the PC is incremented by four. Each instruction is then decoded in the decode stage during the following time period, such that instruction "n" is decoded during time period T2. Each instruction then begins actual execution during the next time period, such as time period T3 for instruction "n". Generally, execution of a given instruction takes several time periods for operand fetch, operation, and result storage.

When an interrupt occurs, such as indicated at 700 during time period T3, fetching of new instructions is halted and a currently executing instruction is completed. In this example, instruction "n" would be completed. During a context switch to service interrupt 700, contents of the PC are saved, in this case the PC contents equal "n+8." When the interrupt service routine is completed, a return is performed, the PC is restored, and execution resumes by fetching the next instruction after the last completed instruction. However, because of the instruction pipeline, the contents of the PC are first adjusted to point to the instruction following the last executed instruction. In this example, the instruction execution pipeline is always backed up by one stage, so the restored PC value is decremented by four, such that the instruction located at address "n+4" is then fetched after returning from interrupt 700.

FIG. 8 is a flow chart illustrating interrupt operation in a processor with an instruction execution pipeline of FIG. 7, according to an aspect of the present invention. While the processor is executing a sequence of instruction, such as sequence 800, in the course of normal system operation an interrupt request 804 is received. As discussed with reference to FIG. 7, normally a currently executing instruction 802 will be completed prior to servicing the interrupt. However, if the currently executing instruction is an interruptible instruction, then execution of the sequence of instructions is suspended by halting execution of the currently executing instruction before it is completed. The interrupt is then serviced by performing a context switch in step 810, executing an interrupt service routine in step 820 and the returning to resume execution of the suspended instruction by performing a return context switch in step 830.

During context switch process 810, in step 812 a test is made to determine if an interruptible instruction was halted by checking the A-bit. This bit is not necessarily part of the status register and in another embodiment the A-bit can be in another system register, or included in control circuitry of an instruction execution pipeline, for example. The A-bit is used by the core to indicate the interrupt return address is to be calculated differently when executing an interruptible instruction as opposed to a non-interruptible instruction. As described earlier, this bit is asserted when an interruptible clean instruction begins operation and is de-asserted when the clean instruction is completed. Thus, in step 810, if the A-bit is not asserted, then the normal interrupt processing is followed and a PC value is saved in step 814 that has an address value of "n+8" as described above. However, if the A-bit is asserted then the PC value is decremented in step 816 by the length of an instruction, four bytes, so that a value of "n+4" is instead saved in step 814. Other registers such as the status register are saved as part of a saved state in step 818.

In the return step 830, after restoring the state saved in step 818, the PC value is adjusted to compensate for instruction execution pipelining by decremented by one instruction length in order to point to instruction 803 following the last executed instruction, as discussed with reference to FIG. 7, as indicated by arc 832. However, in the case where an interruptible clean instruction was halted, as indicated by the A-bit in step 812, then the saved and restored PC value had already been decremented in step 816. Therefore, after being decremented again in step 830, the program counter will again point to instruction 802 and it will be re-fetched and thereby execution of halted instruction 802 will be resumed by performing the initialization test described with respect to FIG. 6B, as indicated by arc 834.

In another embodiment, the PC can be fully adjusted during the initial context switch rather than being adjusted during the return step, as was done in step 830.

Figure 9:
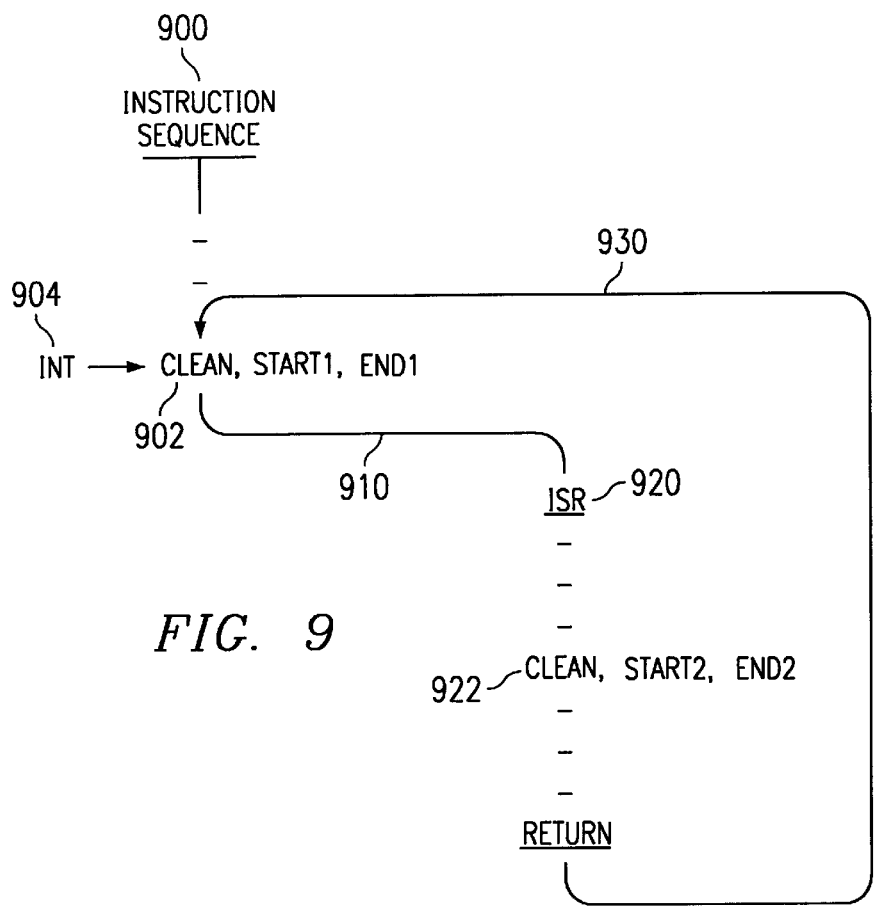
FIG. 9 is a flow chart illustrating re-entrant operation of the interruptible clean instruction of FIG. 6A.

FIG. 9 is a flow chart illustrating re-entrant operation of the interruptible clean instruction of FIG. 6A. Another feature of the interruptible clean instruction is that a second copy of the instruction can be executed while a first copy is in a halted state during an interrupt response in a re-entrant manner. Advantageously, such re-entrant nesting can be repeated any number of times because there are no state saving requirements in the present embodiment that would cause a limit to reentrancy.

For example, an instruction sequence 900 is being executed on a processor. While interruptible clean instruction 902 is being executed using parameters start1 and end1, an interrupt request 904 is received. As described above, the interruptible clean instruction is halted, a context switch 910 occurs and an interrupt service routine (ISR) 920 begins execution. Within this sequence of instructions is a second copy of the clean instruction 922 with parameters start2 and end2. These parameters will be loaded into start register and end register when instruction 922 begins execution. At the end of the second clean execution I-bit is set to zero, is indicated in step 610 of FIG. 6A.

Referring again to FIG. 6B, if the I-bit is set for step 600.1 when clean instruction 922 begins execution, step 600.3 performs a parameter comparison with the current contents of the start and end register. In this case, a first clean-range has just been interrupted, and assuming that at least one of start2, end2 differs from start1, end1, there will not be a match and step 600.2 will be performed to load start2 and end2 into the start register and end register.

When ISR 920 is completed, a return context switch 930 is performed and clean instruction 902 is restarted, as described above. In this case, the I-bit will be zero and clean-range instruction 902 with start1 and end1 parameters will be completely re-executed from the initial parameters; however the incident rate of re-entrant execution is expected to be low such that the extra time required to completely re-execute instruction 902 should not be a significant factor.

Referring again to FIG. 6B, if the I-bit is asserted during step 600.1, then step 600.3 will perform a parameter comparison with the current contents of the start and end register. In this case, a first clean range instruction has been interrupted and assuming that at least one of start2, end2 differed from start1, end1, there will not be a match and step 600.2 will be performed to reload start1 and end1 into the start register and end register. In this case, clean instruction 902 will be completely re-executed from the initial parameters; however the incident rate of re-entrant execution is expected to be low such that the extra time required to completely re-execute instruction 902 should not be a significant factor.

Digital System Embodiment

Figure 10:
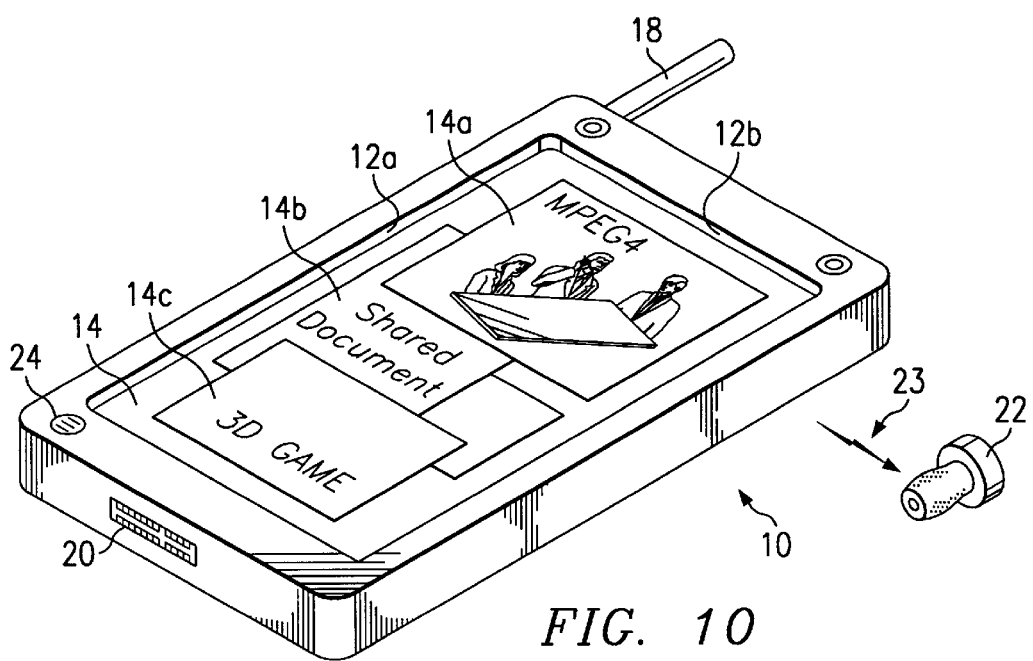
FIG. 10 is a representation of a telecommunications device incorporating an embodiment of the present invention.

FIG. 10 illustrates an exemplary implementation of an example of such an integrated circuit in a mobile telecommunications device, such as a mobile personal digital assistant (PDA) 10 with display 14 and integrated input sensors 12a, 12b located in the periphery of display 14. As shown in FIG. 10, digital system 10 includes a megacell 100 according to FIG. 1 that is connected to the input sensors 12a,b via an adapter (not shown), as an MPU private peripheral 142. A stylus or finger can be used to input information to the PDA via input sensors 12a,b. Display 14 is connected to megacell 100 via local frame buffer similar to frame buffer 136. Display 14 provides graphical and video output in overlapping windows, such as MPEG video window 14a, shared text document window 14b and three dimensional game window 14c, for example.

Radio frequency (RF) circuitry (not shown) is connected to an aerial 18 and is driven by megacell 100 as a DSP private peripheral 140 and provides a wireless network link. Connector 20 is connected to a cable adaptor-modem (not shown) and thence to megacell 100 as a DSP private peripheral 140 provides a wired network link for use during stationary usage in an office environment, for example. A short distance wireless link 23 is also "connected" to earpiece 22 and is driven by a low power transmitter (not shown) connected to megacell 100 as a DSP private peripheral 140. Microphone 24 is similarly connected to megacell 100 such that two-way audio information can be exchanged with other users on the wireless or wired network using microphone 24 and wireless ear piece 22.

Megacell 100 provides all encoding and decoding for audio and video/graphical information being sent and received via the wireless network link and/or the wire-based network link.

It is contemplated, of course, that many other types of communications systems and computer systems may also benefit from the present invention, particularly those relying on battery power. Examples of such other computer systems include portable computers, smart phones, web phones, and the like. As power dissipation and processing performance is also of concern in desktop and line-powered computer systems and micro-controller applications, particularly from a reliability standpoint, it is also contemplated that the present invention may also provide benefits to such line-powered systems.

Fabrication of the digital systems disclosed herein involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

The digital systems disclosed herein contain hardware extensions for advanced debugging features. These assist in the development of an application system. Since these capabilities are part of the megacell itself, they are available utilizing only a JTAG interface with extended operating mode extensions. They provide simple, inexpensive, and speed independent access to the core for sophisticated debugging and economical system development, without requiring the costly cabling and access to processor pins required by traditional emulator systems or intruding on system resources.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false. References to storing or retrieving data in the cache refer to both data and/or to instructions.

While the invention has been described with reference to illustrative embodiments, this description is not intended to be construed in a limiting sense. Various other embodiments of the invention will be apparent to persons skilled in the art upon reference to this description. For example, in another embodiment, the cache memory may be a simple cache that does not include multi-set associativity or configurable features. The cache may be positioned at a level other than L2. The cache may have a different set organization with a different number of segments per line, for example. Likewise, the start and end registers may contain addresses that are segment aligned rather than line aligned. References to data being stored in a cache segment are to be interpreted as meaning data or instructions, depending on a particular cache.

In another embodiment, separate control circuitry can be provided for the cache and for the RAM-set. Alternatively, in another embodiment a RAM-set may not be included.

In another embodiment, the A-bit and I-bit indicator bits may be stored in various manners, such as in a status register, in another register accessible to the processor core, as individual storage bits, in instruction execution pipeline control circuitry, in a memory location, etc.

In another embodiment, provision may be made to save the contents of the start and end register during each context switch. In such an embodiment, an interrupted instruction could be resumed after the interrupted state is restored without a further need to compare initial parameters.

In another embodiment, the program counter can be adjusted to account for instruction pipelining during the context switch process before execution of an ISR rather than during the return context switch. Likewise, for embodiments that have instruction sizes other than four bytes, the program counter is adjusted accordingly.

In another embodiment, other types of instructions that perform a sequence of operations may be made interruptible using aspects of the present invention, such as for example an array processing instruction, a vector instruction, etc.

In another embodiment of the present invention, a clean instruction may be provided with min/max registers that are useful for reducing the range that is to be cleaned.

In another embodiment, step 600.3 may not be needed if another means is provided to determine that a second interruptible instruction is beginning execution. For example, this could be done by including the I-bit in a status register that is saved during context switch and setting I=0 during the context switch so that the second clean instructions sees I=0. In this case, after the return, the I-bit would be restored to I=1. Thus, if the I-bit is asserted at the beginning of execution of an interruptible instruction, then it can be assumed that the instruction is being resumed after an interrupt and the initial parameters are not loaded; but if the I-bit is not asserted when the interruptible instruction begins execution, then the initial parameters are loaded such that the instruction is fully executed.

It is therefore contemplated that the appended claims will cover any such modifications of the embodiments as fall within the true scope and spirit of the invention.

What is claimed is:

1. A method for operating a digital system, comprising the steps of:
  a. executing a sequence of instructions in accordance with a program counter;
  b. receiving an interrupt request;
  c. suspending execution of the sequence of instructions by halting execution of a currently executing instruction before it is completed if the currently executing instruction is an interruptible instruction;
  d. servicing the interrupt; and
  e. resuming execution of the interruptible instruction after returning from servicing the interrupt, wherein step "e" comprises the steps of:
    comparing an initial parameter provided by the interruptible instruction with a current content of a control register used during execution of the interruptible instruction;
    if the same, resuming execution of the interruptible instruction using the current content of the control register, and
    if different, restarting execution of the interruptible instruction by storing the initial parameter provided by interruptible instruction in the control register.

2. The method according to claim 1, wherein step "c" further comprises the step of setting a second indicator bit to indicate that the currently executing instruction is being interrupted; and
  wherein the step of comparing is conditioned on the second indicator bit indicating the interruptible instruction had been interrupted.

3. The method according to claim 1, wherein step "d" comprises executing another sequence of instructions that contain the interruptible instruction, such that a second copy of the interruptible instruction is executed while execution of a first copy of the interruptible instruction is suspended.

4. The method according to claim 1, wherein:
  the interruptible instruction includes parameters not modifiable during execution of the interruptible instruction and parameters modifiable during execution of the interruptible instruction; and
  step "c" comprises performing a context switch by saving state information exclusive of parameters modifiable during execution off the interruptible instruction.

5. A method for operating a digital system, comprising the steps of:
  a. executing a sequence of instructions in accordance with a program counter;
  b. receiving an interrupt request;
  c. suspending execution of the sequence of instructions by halting execution of a currently executing instruction before it is completed if the currently executing instruction is an interruptible instruction;
  d. servicing the interrupt, wherein step "d" comprises executing another sequence of instructions that contain the interruptible instruction, such that a second copy of the interruptible instruction is executed while execution of a first copy of the interruptible instruction is suspended; and
  e. resuming execution of the interruptible instruction after returning from servicing the interrupt.

6. The method according to claim 5, wherein:
  the interruptible instruction includes parameters not modifiable during execution of the interruptible instruction and parameters modifiable during execution of the interruptible instruction; and
  step "c" comprises performing a context switch by saving state information exclusive of parameters modifiable during execution of the interruptible instruction.

7. A method for operating a digital system, comprising the steps of:
  a. executing a sequence of instructions in accordance with a program counter, the sequence of instructions including an interruptible instruction, wherein the interruptible instruction cleans a range of addresses in a storage region specified by a start parameter and an end parameter;

b. receiving an interrupt request;
c. suspending execution of the sequence of instructions by halting execution of a currently executing instruction before it is completed if the currently executing instruction is an interruptible instruction;
d. servicing the interrupt; and
e. resuming execution of the interruptible instruction after returning from servicing the interrupt, and wherein step "e" comprises the steps of:
    comparing the start parameter and the end parameter provided by the clean instruction with a current content of a respective start register and end register used during execution of the clean instruction;
    if the same, resuming execution of the clean instruction using the current content of the start register and end register,
    if different, restarting execution of the clean instruction by storing the start parameter provided by clean instruction in the start register and by storing the end parameter in the end register.

8. The method according to claim 7, wherein: step "c" further comprises the step of setting a second indicator bit to indicate that the currently executing instruction is being interrupted; and
    wherein the step of comparing is conditioned on the second indicator bit indicating the interruptible instruction had been interrupted.

9. The method according to claim 7, wherein step "d" comprises executing another sequence of instructions that contain the interruptible instruction, such that a second copy of the interruptible instruction is executed while execution of a first copy of the interruptible instruction is suspended.

10. The method according to claim 7, wherein:
    the interruptible instruction includes parameters not modifiable during execution of the interruptible instruction and parameters modifiable during execution of the interruptible instruction; and
    step "c" comprises performing a context switch by saving state information exclusive of parameters modifiable during execution of the interruptible instruction.

11. The method according to claim 7, wherein:
    the sequence of instructions includes a start parameter load instruction specifying a start parameter address and an end parameter load instruction specifying an end parameter address;
    the storage region consists of a cache organized in a plurality of cache lines, each cache line having at least one valid bit indicating whether corresponding data in the cache line is valid and at least one dirty bit indicating whether corresponding data in the cache line has been written to since a last write to a higher level memory; and
    executing the interruptible instruction by writing to higher memory data whose corresponding dirty bit indicates that data has not been written to since a last write to higher memory and setting the at least one valid bit for the cache line to indicate invalid for each cache line in a range between the start parameter address and the end parameter address.

12. A digital system comprising:
one or more interconnected processors connected to a cache memory and thereby to a backup memory; and
wherein at least one of the one or more processors comprises:
means for executing a sequence of instructions in accordance with a program counter, the sequence of instructions including at least one interruptible instruction;
means for receiving an interrupt request;
means for suspending execution of the sequence of instructions by halting execution of a currently executing instruction before it is completed if the currently executing instruction is an interruptible instruction;
means for servicing the interrupt; and
means for resuming execution of the interruptible instruction after returning from servicing the interrupt including:
    comparing an initial parameter provided by the interruptible instruction with a current content of a control register used during execution of the interruptible instruction;
    if the same, resuming execution of the interruptible instruction using the current content of the control register, and
    if different, restarting execution of the interruptible instruction by storing the initial parameter provided by interruptible instruction in the control register.

13. The digital system according to claim 12, wherein:
said one or more processors further comprises a second indicator bit to indicate that the currently executing instruction is being interrupted; and
in said means for resuming execution of the interruptible instruction said comparing is conditioned on the second indicator bit indicating the interruptible instruction had been interrupted.

14. The digital system according to claim 12, wherein:
said means for servicing the interrupt executes another sequence of instructions that contain the interruptible instruction, such that a second copy of the interruptible instruction is executed while execution of a first copy of the interruptible instruction is suspended.

15. The digital system according to claim 12, wherein:
the interruptible instruction includes parameters not modifiable during execution of the interruptible instruction and parameters modifiable during execution of the interruptible instruction; and
said means for suspending execution of the sequence of instructions performs a context switch by saving state information exclusive of parameters modifiable during execution of the interruptible instruction.

16. A digital system comprising:
a cache organized in a plurality of cache lines, each cache line including
    a data array storing data,
    a tag storing an address corresponding to said data stored in said data array,
    at least one valid bit indicating whether corresponding data in said data array is valid, and
    at least one dirty bit indicating whether corresponding data in said data array has been written to since a last write to a higher level memory;
said cache further including control circuitry including a start address register,
    a first comparator having a first input connected to said start address register, a second input and an output indicating whether said first and second inputs equal,
    a pointer address register,
    an end address register,
    a second comparator having a first input connected to said pointer address register, a second input connected to said end address register and an output indicating whether said first and second inputs equal,
    a third comparator having a first input connected to said end address register, a second input and an output indicating whether said first and second inputs equal, and a finite state machine connected to said pointer address register and said second comparator operable during execution of an interruptible cache operation instruction to periodically increment an address stored in said pointer address register until said second comparator output indicates equal;

a data processor including a register file including a plurality of general purpose registers storing corresponding data, said data processor operable to execute instructions recalled from memory, said data processor operable to load data from a first general purpose register specified by a first operand field of an interruptible cache operation instruction into said start address register and into said pointer address register in response to an interruptible cache operation instruction, to load data from a second general purpose register specified by a second operand field of an interruptible cache operation instruction into said end address register in response to an interruptible cache operation instruction, to perform an instruction specified cache state operation on an address range specified by said start address register and said end address register in response to an interruptible cache state operation instruction employing said finite state machine to specify each address within said address range, to suspend execution of a currently executing instruction before it is completed if the currently executing instruction is an interruptible cache state operation instruction and thereafter service the interrupt, to resume execution of the interruptible cache state operation instruction after servicing the interrupt by
    supplying data from said first general purpose register to said second input of said first comparator,
    supplying data from said second general purpose register to said second input of said third comparator,
    resuming execution of the interruptible cache operation instruction using the current content of said pointer register and said end register if said outputs of first and third comparators indicate equal, and
    restarting execution of the interruptible cache operation instruction by reloading said start address register from said first general purpose register and reloading said end address register from said second general purpose register if said output of either said first comparator does not indicate equal or said third comparator does not indicate equal.

17. The digital system of claim 16, wherein:

said interruptible cache operation instruction is a flush address range instruction; and said data processor executes said flush address range instruction by setting to indicate invalid all valid bits of cache lines in said address range specified by said start address register and said end address register.

18. The digital system of claim 16, wherein:

said interruptible cache operation instruction is a clean address range instruction; and said data processor executes said clean address range instruction by writing to the higher memory all data in said address range specified by said start address register and said end address register whose corresponding dirty bits indicate said data array has been written to since a last write to a higher level memory and setting all dirty bits in said address range specified by said start address register and said end address register to indicate said data array has not been written to since a last write to a higher level memory.

19. The digital system of claim 16, wherein:

said interruptible cache operation instruction is a clean and flush address range instruction; and said data processor executes said clean and flush address range instruction by writing to the higher memory all data in said address range specified by said start address register and said end address register whose corresponding dirty bits indicate said data array has been written to since a last write to a higher level memory and setting to indicate invalid all valid bits of cache lines in said address range specified by said start address register and said end address register.

* * * * *